(12) United States Patent
Tahir et al.

(10) Patent No.: US 11,231,715 B2
(45) Date of Patent: Jan. 25, 2022

(54) METHOD AND SYSTEM FOR CONTROLLING A VEHICLE

(71) Applicant: King Fahd University of Petroleum and Minerals, Dhahran (SA)

(72) Inventors: Haseeb Tahir, Dhahran (SA); Uthman Baroudi, Dhahran (SA); N. Mujahid Syed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 235 days.

(21) Appl. No.: 16/044,562

(22) Filed: Jul. 25, 2018

(65) Prior Publication Data
US 2019/0361452 A1 Nov. 28, 2019

Related U.S. Application Data

(60) Provisional application No. 62/674,986, filed on May 22, 2018.

(51) Int. Cl.
| | | |
|---|---|---|
| G05D 1/02 | (2020.01) | |
| B60W 30/095 | (2012.01) | |
| B60W 50/00 | (2006.01) | |
| G01S 13/56 | (2006.01) | |
| B25J 9/16 | (2006.01) | |

(52) U.S. Cl.
CPC .......... *G05D 1/0214* (2013.01); *B25J 9/1676* (2013.01); *B60W 30/0956* (2013.01); *B60W 50/0097* (2013.01); *G01S 13/56* (2013.01); *G05B 2219/40519* (2013.01); *G05D 2201/0213* (2013.01); *G06T 2207/30252* (2013.01)

(58) Field of Classification Search
CPC ...... G05D 1/0214; G01S 13/56; B25J 9/1676; B60W 30/0956; B60W 50/0097
See application file for complete search history.

(56) References Cited

U.S. PATENT DOCUMENTS

| | | | | |
|---|---|---|---|---|
| 5,366,376 A | * | 11/1994 | Copperman | .......... A63F 13/005 |
| | | | | 434/69 |
| 7,248,952 B2 | | 7/2007 | Ma et al. | |
| 7,447,593 B2 | * | 11/2008 | Estkowski | ........... G05D 1/0212 |
| | | | | 701/301 |
| 9,074,896 B2 | | 7/2015 | Mathews et al. | |

(Continued)

OTHER PUBLICATIONS

Sun, Xinmiao, "Static and dynamic optimization problems in cooperative multi-agent systems", Boston University Theses & Dissertations, 2017, pp. 1-138.

(Continued)

*Primary Examiner* — Hunter B Lonsberry
*Assistant Examiner* — Daniel L Greene
(74) *Attorney, Agent, or Firm* — Oblon, McClelland, Maier & Neustadt, L.L.P.

(57) ABSTRACT

Method and system for controlling a vehicle that includes using velocity vectors of obstacles in the vehicle's environment to determining boundaries of the one or more obstacles and thereby generate a velocity space that may include velocity vectors for the vehicle and which are represented as collision cones. The using an identified velocity vector in combination with the velocity vectors of the one or more obstacles to produce a maximum motion in of the vehicle towards a target location while avoiding all determined collision cones.

16 Claims, 13 Drawing Sheets

(56) References Cited

U.S. PATENT DOCUMENTS

| | | | |
|---|---|---|---|
| 9,076,337 B2 | 7/2015 | Wang et al. | |
| 9,216,745 B2 | 12/2015 | Beardsley et al. | |
| 9,423,497 B2 | 8/2016 | Slapak et al. | |
| 9,568,915 B1 | 2/2017 | Berntorp et al. | |
| 9,639,813 B2 | 5/2017 | Yedidia et al. | |
| 2007/0080825 A1* | 4/2007 | Shiller | B62D 15/029 340/903 |
| 2007/0228703 A1* | 10/2007 | Breed | B60N 2/0232 280/735 |
| 2009/0259402 A1* | 10/2009 | Gates | G08G 3/02 701/301 |
| 2015/0284010 A1* | 10/2015 | Beardsley | B60W 50/10 701/41 |
| 2017/0219353 A1* | 8/2017 | Alesiani | G05D 1/0217 |
| 2017/0263130 A1 | 9/2017 | Sane et al. | |
| 2017/0308102 A1 | 10/2017 | Sane et al. | |
| 2018/0005053 A1 | 1/2018 | Browning et al. | |
| 2018/0073918 A1* | 3/2018 | Onasch | G05D 1/0094 |
| 2018/0079420 A1* | 3/2018 | Aine | G08G 1/166 |
| 2018/0290747 A1* | 10/2018 | Chakravarthy | G05D 1/101 |
| 2019/0072980 A1* | 3/2019 | Kumar | G05D 1/0289 |
| 2019/0108764 A1* | 4/2019 | Fragoso | G06T 7/70 |
| 2019/0179316 A1* | 6/2019 | Siskind | G05D 1/10 |
| 2019/0258251 A1* | 8/2019 | Ditty | G05D 1/0088 |

OTHER PUBLICATIONS

Paden, et al., "A Survey of Motion Planning and Control Techniques for Self-driving Urban Vehicles", IEEE Transactions on Intelligent Vehicles, vol. 1, Issue 1, Mar. 2016, pp. 1-27.

\* cited by examiner

METHOD AND SYSTEM FOR CONTROLLING A VEHICLE

CROSS-REFERENCE TO RELATED APPLICATIONS

This application claims the benefit of priority from U.S. Provisional Application No. 62/674,986 filed May 22, 2018, the entire contents of which are incorporated herein by reference.

BACKGROUND

Field of Disclosure

The present disclosure relates generally to methods and systems for controlling vehicles such as autonomous vehicles to avoid collisions with stationary and moving obstacles by taking into account velocity vectors associated with the controlled vehicle and the obstacles.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Motion planning is a critical attributes of autonomous systems. Some early applications of motion planning were found in trajectory optimization problems related to rocket propulsion and space exploration. See J. V. Breakwell, "The optimization of trajectories," *Journal of the Society for Industrial and Applied Mathematics*, vol. 7, no. 2, pp. 215-247, 1959; and H. Robbins, "Optimality of intermediate-thrust arcs of rocket trajectories," *AIAA Journal*, vol. 3, no. 6, pp. 1094-1098, 1965. Automation in the manufacturing industry brought forward new ways that could be explored using motion planning techniques. See K. Shin and N. McKay, "A dynamic programming approach to trajectory planning of robotic manipulators," *IEEE Transactions on Automatic Control*, vol. 31, no. 6, pp. 491-500, 1986; M. K. Jouaneh, Z. Wang, and D. A. Dornfeld, "Trajectory planning for coordinated motion of a robot and a positioning table. i. path specification," *IEEE Transactions on Robotics and Automation*, vol. 6, no. 6, pp. 735-745, 1990; V. Rajan, "Minimum time trajectory planning," in *Robotics and Automation. Proceedings. 1985 IEEE International Conference on*, vol. 2, pp. 759-764, IEEE, 1985; J. Angeles, A. Rojas, and C. S. Lopez-Cajun, "Trajectory planning in robotic continuous-path applications," *IEEE Journal on Robotics and Automation*, vol. 4, no. 4, pp. 380-385, 1988; S. M. LaValle, *Planning algorithms*. Cambridge university press, 2006; and D. Schoenwald, "Auvs: In space, air, water, and on the ground," *IEEE Control Systems Magazine*, vol. 20, no. 6, pp. 15-18, 2000.

Recently motion planning has been used in systems for machine learning, advanced manufacturing, puzzle solutions, computer graphics, games, navigation in self-driving cars and Autonomous Unmanned Vehicles (AUV). These applications are typical examples of trajectory planning where multiple decision making agents plan motion in a common environment. Most of these applications occur in large, dynamic and complicated environments where global information is difficult to obtain and each agent may have to rely on information obtained second hand from nearby. The agents may or may not be able to communicate with each other in an environment that may also contain static or dynamic obstacles. These complications make it difficult to solve motion planning. Motion planning methods, systems and algorithms must still be developed for local deployment agents.

Motion planning for single agent in the presence of static obstacles can be modeled mathematically and the resulting model used as a predictive basis for motion planning. However, severe difficulties arise due to the presence of collision avoidance constraints such as that shown in Equation (1) which make determining a solution vector non-convex:

$$\|p_a - q_i\|_m \geq D \tag{1}$$

where, $p_a$ and $q_i$ are the current positions of the agent a and obstacle i respectively, $\|\,\|_m$ is the $m^{th}$ norm and D is the minimum distance between their centers to avoid collision.

Motion planning in the presence of dynamic obstacles if further complicated by a combination of path planning and velocity planning problems. See P. Fiorini and Z. Shiller, "Motion planning in dynamic environments using velocity obstacles," *The International Journal of Robotics Research*, vol. 17, no. 7, pp. 760-772, 1998. The dynamic motion planning problem where each agent is modeled as a point among multiple moving bodies with bounded velocity is proven to be a NP-hard problem. See J. Canny and J. Reif, "New lower bound techniques for robot motion planning problems," in *Foundations of Computer Science, 1987, 28$^{th}$ Annual Symposium on*, pp. 49-60, IEEE, 1987.

Generally, onboard motion planning (e.g., real time dynamic planning), especially when performed in dynamic environment, is a complicated task. Current methods developed deal with such problems either computationally at great expense or compromise too much on optimality (shortest path).

Trajectory planning methods give a limited set of finite transformations that can be applied to an agent from its initial location to a goal location. The set of all possible transformations that may move an agent from an initial location to any other location is referred as state space or Configuration Space (C-space). In simple words, C-space is actually how the agent sees and understands its environment and primarily depends on how the problem is modeled or presented. There is a lot of unnecessary detail in the environment and therefore, the problem should be formulated in a way that it uses the available information efficiently and thus may be optimized with the limited onboard resources (e.g., limited or handicapped computational characteristics or processing power). Solving the problem also depends on the number, location and capabilities of available sensors present on or around the agent that give information about the environment. Solution should provide the best sequence of transformations that yields a most efficient trajectory to the target.

Algorithms and models developed for motion planning can be classified into 4 types: mathematical programming algorithms, Artificial Potential Field methods (APF), sampling based methods and reactive or sensor based methods. The mathematical programming techniques use the usual Operations Research (OR) models to find solution trajectories. On the other hand, APFs construct a virtual force function which produces a force field creating attractive force towards the target and repulsive force away from the obstacles. Hence, the resultant force guides the agent with collision free motion towards its target. The concept was first introduced in O. Khatib and was later on applied for robotic arm mechanisms. See O. Khatib, "Real-time obstacle avoidance for manipulators and mobile robots," in *Autonomous robot vehicles*, pp. 396-404, Springer, 1986.

In contrast to the above, sampling based algorithms models or methods can address complicated motion planning problems and the challenges faced by potential field methods may be solved by them, especially where a complicated higher dimensional motion is required. Reactive methods plan motion by only using the local information available to the agent in its nearby vicinity. These methods are mostly suitable for onboard path planning where computational resources are limited.

A classical way to model multi agent path planning problems with no obstacle is discussed in F. Augugliaro et al. See F. Augugliaro, A. P. Schoellig, and R. D'Andrea, "Generation of collision-free trajectories for a quadrocopter fleet: A sequential convex programming approach," in *Intelligent Robots and Systems (IROS), 2012 IEEE/RSJ International Conference on*, pp. 1917-1922, IEEE, 2012. The problem is shown by a quadratic programming model that minimizes the thrust required for each agent to traverse a collision free path and reach the known target location. The difficulty arises due to the presence of collision avoidance constraints which are typically non-convex and are linearly approximated with sequential convex programming approach to find collision free paths. The method is further extended with an Incremental Sequential Convex Programming (ISCP) approach in Y. Chen et al. with both coupled and decoupled variations. See Y. Chen, M. Cutler, and J. P. How, "Decoupled multiagent path planning via incremental sequential convex programming," in *Robotics and Automation (ICRA), 2015 IEEE International Conference on*, pp. 5954-5961, IEEE, 2015. ISCP slightly improves the results presented in F. Augugliaro et al. in terms of computational time and gives feasible solutions even in non-convex shaped environments. However, these techniques are heuristic methods and give sub-optimal solutions in the presence of dynamic agents. The reverse convex constraints as presented in Equation (1) above have been well studied in the literature and algorithms, models, calculations and methods have may be used finding solutions specifically for convex problems with only one additional reverse convex constraint. See H. Tuy, "Convex programs with an additional reverse convex constraint," *Journal of Optimization Theory and Applications*, vol. 52, no. 3, pp. 463-486, 1987; and P. T. Thach, R. E. Burkard, and W. Oettli, "Mathematical programs with a two-dimensional reverse convex constraint," *Journal of Global Optimization*, vol. 1, no. 2, pp. 145-154, 1991. However, these techniques are inappropriate for multi agent dynamic environments where numerous such constraints may be present and the feasible space may become complicated enough to be globally analyzed.

Mixed Integer Linear Programming (MILP) models can also be used for non-convex solution such as in T. Schouwenaars et al., where the usual quadratic cost function is expressed as weighted norm-1 instead of the positive definite weighting matrices and each obstacle as a polytope. See T. Schouwenaars, B. De Moor, E. Feron, and J. How, "Mixed integer programming for multi-vehicle path planning," in *Control Conference (ECC), 2001 European*, pp. 2603-2608, IEEE, 2001. Each of the linear constraints forming these polytopes is associated with an integer variable so that the non-convex feasible space can be searched for the optimal path. A similar formulation, for a set of spacecraft travelling in space, is presented in A. Richards et al. that avoids collision and plume impingement with other spacecraft and obstacles. See A. Richards, T. Schouwenaars, J. P. How, and E. Feron, "Spacecraft trajectory planning with avoidance constraints using mixed-integer linear programming," *Journal of Guidance, Control, and Dynamics*, vol. 25, no. 4, pp. 755-764, 2002. A slightly different variation is presented in J. Peng et al. where multi agent motion planning problem is formulated as Mixed Integer Non Linear Programming (MINLP) and later converted to MILP by obtaining schedules that form upper and lower bounds on optimal solution via solving two MILP problems. See J. Peng and S. Akella, "Coordinating multiple robots with kinodynamic constraints along specified paths," *The International Journal of Robotics Research*, vol. 24, no. 4, pp. 295-310, 2005.

Two point boundary value problems are solved to find minimum and maximum times taken by each agent to traverse a segment by putting constraints on accelerations and finding achievable final velocities. Motion planning in quadrotors is also an application of Mixed Integer Programming (MIP) models where the trajectories are planned in 3-D space, for instance in D. Mellinger et al. See D. Mellinger, A. Kushleyev, and V. Kumar, "Mixed-integer quadratic program trajectory generation for heterogeneous quadrotor teams," in *Robotics and Automation (ICRA), 2012 IEEE International Conference on*, pp. 477-483, IEEE, 2012. A Mixed Integer Quadratic Programming (MIQP) model is presented as an extension of MILP. The control inputs for position, roll, pitch and yaw angles are optimized for each of the discrete time instants and piece-wise smooth polynomial functions are used at the end to synthesize smooth trajectories so that they can be followed accurately. Also, Legendre polynomials are used as basis functions to ensure numerical stability of the solver. The MIP techniques may render optimal or near optimal solutions, but are computationally very expensive due to the presence of integer variables. The problem dimensionality increases exponentially with increasing number of agents and huge computational resources and time may be required for optimization. Additionally, mathematical programming techniques require central computing and sensing capabilities which may not be feasible for many real world applications.

The numerical complexities faced by the mathematical programming models may be avoided by another set of methods known as Artificial Potential Field (APF), first introduced in O. Khatib. The collision free trajectory is obtained by introducing a virtual force field function which depends on the location and shape of target and obstacles. APF methods provide a simple procedure of collision avoidance in motion planning problems but their mathematical analysis shows some limitations making them unsuitable for some real world applications. One difficulty is the trapping of algorithm in local minima which occurs in situations when the forces due to attractive fields and repulsive fields balance out each other. This may be caused due to the relative location of target and obstacles with respect to the agent or the obstacle shape or size. Second issue is the limitation of motion between the closely spaced obstacles. This is due to the reason that repulsive forces produced by the obstacles are high enough to overcome the attractive forces even when the space between the obstacles allows robot motion. Third issue is the oscillating motion, while moving near the obstacles and narrow passages. See Y. Koren and J. Borenstein, "Potential field methods and their inherent limitations for mobile robot navigation," in *Robotics and Automation, 1991. Proceedings, 1991 IEEE International Conference on*, pp. 1398-1404, IEEE, 1991.

The issue of local minima has been investigated with detailed mathematical analysis for example in E. Rimon et al. See E. Rimon and D. E. Koditschek, "Exact robot navigation using artificial potential functions," *IEEE Transactions on robotics and automation*, vol. 8, no. 5, pp. 501-518, 1992. The study of the potential field function shows its non-convexity particularly near the obstacles. So, the navigation functions are constructed by incorporating certain parameters in the potential function in a way that local maxima only occurs at the boundary of the active space. First, a Boolean combination of sets are used to transform the Euclidean space and then scalar conditioning functions are introduced to level out the non-convexity to some extent. But tweaking these parameters for different scenarios may be infeasible for dynamic environment and very complicated even for static environments when performed by the onboard computing system of the agent.

Attempts have also been made to address the issue of oscillations while moving through narrow passages for example in J. Borenstein et al. where the grid histogram model of the environment is reduced to one dimensional polar histogram. See J. Borenstein and Y. Koren, "Real-time obstacle avoidance for fast mobile robots," *IEEE Transactions on systems, man, and cybernetics*, vol. 19, no. 5, pp. 1179-1187, 1989. Similarly, a Newtonian Potential Field (NPF) based model has been proposed in J.-H. Chuang et al., where a uniform charge distribution on the boundaries of polygonal regions is assumed that can be derived in closed form. See J.-H. Chuang and N. Ahuja, "An analytically tractable potential field model of free space and its application in obstacle avoidance," *IEEE Transactions on Systems, Man, and Cybernetics, Part B (Cybernetics)*, vol. 28, no. 5, pp. 729-736, 1998. The representation of charge distribution in closed form avoids computationally expensive numerical evaluation of repulsion which requires discretization of regions' boundaries. The repulsive forces are minimized by a gradient search method and then a local planning algorithm is used to find collision free paths in nearby vicinity that are latter connected to obtain the global path. This method may produce oscillation free motion through narrow passages but cannot address the issues related to the existence of local minima. Another issue faced by APF methods is Goal Non-Reachable with Obstacles Nearby (GNRON) which is because of the non-convexity of potential function in the presence of obstacles near goal position. To ensure that global minimum of potential function lies only at the goal position, an additional function is introduced in the potential field expression that depends on the distances of goal and obstacles from the agent's position. See S. S. Ge and Y. J. Cui, "New potential functions for mobile robot path planning," *IEEE Transactions on robotics and automation*, vol. 16, no. 5, pp. 615-620, 2000.

APF approaches may also be extended to address dynamic motion planning problems requiring soft landing of agents on moving targets. Such problems may be addressed by incorporating velocities, in addition to the positions, of targets and obstacles in the potential function. A similar model is presented in S. S. Ge et al. which is later formulated with non-holonomic differential constraints and the algorithm is applied in different scenarios of multi agent dynamic environment problems. See S. S. Ge and Y. J. Cui, "Dynamic motion planning for mobile robots using potential field method," *Autonomous robots*, vol. 13, no. 3, pp. 207-222, 2002. This approach may provide feasible solutions but assumes the environment to be dynamic enough such that the issue of local minima does not persist for long. Different local planning methods and heuristics are proposed for dealing with the local minima issues, however, there seems to be no inherent solution to it. An even bigger complication is to find out whether the agent is trapped in local minima or is it just trying to oscillate because of the overall motion of target and obstacles.

Potential field methods have been applied in several real scenarios like P. Vadakkepat et al. where multiple soccer playing robots are present. See P. Vadakkepat, T. H. Lee, and L. Xin, "Application of evolutionary artificial potential field in robot soccer system," in *IFSA World Congress and 20th NAFIPS International Conference*, 2001. Joint 9th, pp. 2781-2785, IEEE, 2001. However, these methods may require sophisticated sensing systems to accurately capture the environmental details so that the requisite force fields are generated. Also, the issues of path and being stuck into local minima still persist. Although, these challenges have been addressed through some heuristic methods and regression based techniques, their practical use is a complicated task. The situation complicates even further when the obstacles and target may even be moving in a multi agent environment and this simplistic model of the motion planning problem may not achieve the desired results. See J. Sheng, G. He, W. Guo, and J. Li, "An improved artificial potential field algorithm for virtual human path planning," in *International Conference on Technologies for E-Learning and Digital Entertainment*, pp. 592-601, Springer, 2010; and G. Li, A. Yamashita, H. Asama, and Y. Tamura, "An efficient improved artificial potential field based regression search method for robot path planning," in *Mechatronics and Automation (ICMA)*, 2012 *International Conference on*, pp. 1227-1232, IEEE, 2012.

In contrast to the above, sampling based algorithms can address complicated motion planning problems and the challenges faced by the exact methods may be solved by them, especially where a complicated higher dimensional motion is required. Sampling based algorithms generally consist of two steps; first is to acquire a probabilistic sample of configuration space and second is to search for the desired trajectories by an appropriate metaheuristic. Two of the most well-known classical sampling based algorithms are Probabilistic Road Maps (PRMs) and Rapidly exploring Random Trees (RRTs). Roadmaps define the configuration space topology by developing a network of collision free trajectories and PRMs are simply the Monte-Carlo evolution of the roadmaps. On the other hand, incremental search methods such as dynamic programming, A*, bi-directional search etc. evolved into randomized methods like RRT. PRMs evolved from the concept of expansive spaces where, the sampling is expanded in only relevant portion of the configuration space. Such methods have been applied in multi-degree complex robotic movements especially in the maintainability of automotive industry. See D. Hsu, J.-C. Latombe, and R. Motwani, "Path planning in expansive configuration spaces," in *Robotics and Automation*, 1997. *Proceedings*, 1997 *IEEE International Conference on*, vol. 3, pp. 2719-2726, IEEE, 1997. Alternatively, RRTs randomly explore the environment by biasing the search through random sampled points in unexplored portion of the state space and are specifically designed to handle problems with non-holonomic constraints and high degree of freedom. See S. M. LaValle, "Rapidly-exploring random trees: A new tool for path planning," 1998; and S. M. LaValle and J. J. Kuffner Jr, "Rapidly-exploring random trees: Progress and prospects," 2000. Several versions of RRTs such as single RRT planners, bi-directional planners and few other approaches have been studied and presented for various practical applications with non-linear models of three, seven and nine dimensions (due to the inclusion of kinematic variables and constraints). See S. M. LaValle; and P. Cheng, Z. Shen, and S. La Valle, "Rrt-based trajectory design for autonomous automobiles and spacecraft," *Archives of control sciences*, vol. 11, no. 3/4, pp. 167-194, 2001. The RRT and PRM based methods are only probabilistically complete, i.e., the probability that they return a solution if one exists increases with the number of samples. See J. Barraquand, L. Kavraki, R. Motwani, J.-C. Latombe, T.-Y. Li, and P. Raghavan, "A random sampling scheme for path planning," in *Robotics Research*, pp. 249-264, Springer, 1996. For instance, when RRTs are run multiple times, they show a considerable improvement in the solution quality with lower cost paths although they may not converge to the optimal solution. See P. H. Borgstrom, M. Stealey, M. A. Batalin, and W. J. Kaiser, "2006 ieee/rsj international conference on intelligent robots and systems, iros 2006," in 2006 *IEEE/RSJ International Conference on Intelligent Robots and Systems, IROS* 2006, 2006. Also, they are proven not to be asymptotically optimal and for simplified PRMs, where optimality may not be the concern, are computationally expensive. See S. Karaman and E. Frazzoli, "Sampling-based algorithms for optimal motion planning," *The international journal of robotics research*, vol. 30, no. 7, pp. 846-894, 2011. To deal with bigger configuration spaces with higher memory requirements, RRT* is extended as RRT* Fixed Nodes by limiting the memory requirements using node removal procedure. See O. Adiyatov and H. A. Varol, "Rapidly-exploring random tree based memory efficient motion planning," in Mechatronics and Automation (ICMA), 2013 IEEE International Conference on, pp. 354-359, IEEE, 2013. The optimality is comparable to RRT* with limited memory resources. RRTs may also be used in multi agent problems where each agent may have its own RRT instance which makes the search process time consuming. RRG, an extension of RRT, is another way to deal with multi agent problems where each agent develops a random sub-graph biased towards its goal node and then different sub-graphs are connected together in a network. See R. Kala, "Rapidly exploring random graphs: motion planning of multiple mobile robots," *Advanced Robotics*, vol. 27, no. 14, pp. 1113-1122, 2013. Although RRG is computationally more expensive than RRTs, it is better in terms of optimality and overall processing time as it is run individually on each agent. PRMs have also been used with Dynamic Robot Networks (DRN) in dynamic motion planning problems but heavily relies on robot network communication for environment sampling. See C. M. Clark, "Probabilistic road map sampling strategies for multi-robot motion planning," *Robotics and Autonomous Systems*, vol. 53, no. 3, pp. 244-264, 2005.

Another group of sampling based methods is of Artificial Intelligence (AI) algorithms such as A*, D*, focused D*, LPA*, D* Lite etc. See O. Souissi, R. Benatitallah, D. Duvivier, A. Artiba, N. Belanger, and P. Feyzeau, "Path planning: A 2013 survey," in Industrial Engineering and Systems Management (IESM), Proceedings of 2013 International Conference on, pp. 1-8, IEEE, 2013. The environment may be modeled using regular grids, irregular grids, navigation mesh, visibility graph and veronoi diagram. These graphing methods are more suitable to 2-D environments. The computationally expensive environmental sampling in AI algorithms may be improved to some extent by using the concept of super nodes where each super node represents a group of connected sub-graphs. See P. ˇSvestka and M. H. Overmars, "Coordinated path planning for multiple robots," *Robotics and autonomous systems*, vol. 23, no. 3, pp. 125-152, 1998, incorporated herein by reference in its entirety. AI methods have also been extended for 3-D spaces as well. See J. Carsten, D. Ferguson, and A. Stentz, "3d field d: Improved path planning and replanning in three dimensions," in *Intelligent Robots and Systems, 2006 IEEE/RSJ International Conference on*, pp. 3381-3386, IEEE, 2006. Another set of metaheuristics are known as the evolutionary algorithms. Some of the evolutionary metaheuristics proposed in the literature are Ant-Colony (ACO), Simulated Annealing (SA) and Genetic Algorithms (GA). Some recent work in the literature on evolutionary algorithms is presented in R. Kala; M. Alajlan et al.; I. Châari et al., *Procedia Computer Science*; and I. Châari et al, *International Journal of Advanced Robotic Systems*. See R. Kala, "Multi-robot path planning using co-evolutionary genetic programming," *Expert Systems with Applications*, vol. 39, no. 3, pp. 3817-3831, 2012; M. Alajlan, A. Koubaa, I. Châari, H. Bennaceur, and A. Ammar, "Global path planning for mobile robots in large-scale grid environments using genetic algorithms," in *Individual and Collective Behaviors in Robotics (ICBR)*, 2013 International Conference on, pp. 1-8, IEEE, 2013; I. Châari, A. Koubâa, H. Bennaceur, A. Ammar, S. Trigui, M. Tounsi, E. Shakshuki, and H. Youssef, "On the adequacy of tabu search for global robot path planning problem in grid environments," *Procedia Computer Science*, vol. 32, pp. 604-613, 2014; and I. Châari, A. Koubâa, S. Trigui, H. Bennaceur, A. Ammar, and K. Al-Shalfan, "Smartpath: An efficient hybrid aco-ga algorithm for solving the global path planning problem of mobile robots," *International Journal of Advanced Robotic Systems*, vol. 11, no. 7, p. 94, 2014. The performance of GA is analyzed in M. Alajlan et al. in large sized grid environments with various crossover and mutation probabilities. It performs similar to A* and it is concluded that GA may be used to improve the existing solutions obtained by A*. Similarly, SA is compared with A* and GA and it is shown to give a solution for large grids. A hybrid method is suggested in I. Châari, *International Journal of Advanced Robotic Systems*, to combine ACO and GA. The algorithm looks for a solution through an improved version of ACO and then tries to improve solution quality using GA. The main advantage of evolutionary metaheuristics is their solution efficiency but same results may not be reproduced because of their stochastic nature. Although, the convergence in sampling based algorithms requires many samples, they may still be used as heuristic methods for escaping the local minima issues.

In contrast to all the above discussed methods, reactive methods plan motion by only using the local information available to the agent in its nearby vicinity. Such methods are suitable for onboard path planning where computational resources are limited. The issue of local minima faced by previous methods is solved by certain sensors based methods that work similar to the boundary following approach found in bug algorithms. See S. S. Ge, X. Lai, and A. Mamun, "Boundary following and globally convergent path planning using instant goals," *IEEE Transactions on Systems, Man, and Cybernetics, Part B (Cybernetics)*, vol. 35, no. 2, pp. 240-254, 2005, incorporated herein by reference in its entirety. The algorithm uses instant goal approach that combines the lower level boundary following approach with the higher level path planning algorithm to find trajectory of the agent. This helps in planning path when obstacles boundaries are far away and the algorithm does not get stuck in local minimas. Another similar sensor based method is named as Nay. See F. Mastrogiovanni, A. Sgorbissa, and R. Zaccaria, "Robust navigation in an unknown environment with minimal sensing and representation," *IEEE Transac-* tions on *Systems, Man, and Cybernetics, Part B (Cybernetics)*, vol. 39, no. 1, pp. 212-229, 2009, incorporated herein by reference in its entirety. Using the same principle, the agent moves straight towards the target and starts to track obstacles boundaries when the obstacle is detected. To deal with the issue of loops trap, the potential function which guides the agent towards its target includes an indicator whose value increases whenever the agent is trapped in a loop. The algorithm is able to solve navigation problem with minimal information and does not require self-localization which is computationally expensive. However, there is no systematic way to detect the of loop traps without any self-localization mechanism. Some biological immune systems inspired fuzzy models have also been proposed to deal with the local minima trap. See G.-C. Luh and W.-W. Liu, "An immunological approach to mobile robot reactive navigation," *Applied Soft Computing*, vol. 8, no. 1, pp. 30-45, 2008, incorporated herein by reference in its entirety. The method is referred to as reactive immune networks in which the affinity functions are defined by the same idea used in APF methods, i.e., creating a repulsive and attractive force using obstacles and target respectively. Detection of the trap of local minima is done by analyzing the change in movement angle of motion of the agent. An algorithm is developed to obtain virtual targets and this information in combination with the reactive immune network leads the agent out of the trap.

The concept of collision cones assumes that an agent can acquire velocity information of objects in its environment and construct collision cones based on this data. If the current velocity vector of the agent falls into any of these cones, the collision is likely to occur. Collision cones are used to model the real map and are then transformed into virtual maps by transforming each obstacle as a virtual robot. Collision can be predicted by analyzing the collision cone's changes in agent velocity or agent velocity angle. See F. Belkhouche, "Reactive path planning in a dynamic environment," *IEEE Transactions on Robotics*, vol. 25, no. 4, pp. 902-911, 2009, incorporated herein by reference in its entirety. These changes are incorporated in the differential motion parameters to obtain the required motion. The difficulty arises in the presence of cluttered environment and narrow passages when there are too many collision cones and there should be a mechanism in place to decide the priority of obstacle to be avoided. The problem becomes non-convex as a velocity needs to be searched in a set of non-convex collision cones. Bearing angles, which can be obtained through camera sensor data, may be used like collision cones for navigation by air or sea. See R. Sharma, J. B. Saunders, and R. W. Beard, "Reactive path planning for micro air vehicles using bearing-only measurements," *Journal of Intelligent & Robotic Systems*, vol. 65, no. 1, pp. 409-416, 2012, incorporated herein by reference in its entirety. These methods may be simple to implement and effective for very small number of obstacles but are infeasible for cluttered environments. The reactive methods have also been suggested for non-holonomic motion planning where the algorithm switches between three different approaches. See A. V. Savkin and M. Hoy, "Reactive and the shortest path navigation of a wheeled mobile robot in cluttered environments," *Robotica*, vol. 31, no. 02, pp. 323-330, 2013, incorporated herein by reference in its entirety. However, if global information is not available, it relies on boundary tracking with similar results as in some previously discussed methods. Reactive path planning techniques are generally greedy algorithms but the idea of collision cones provides a sound mathematical foundation of the problem for further optimization. Therefore, such ideas have been extended with some mathematical programming techniques to avoid collision in multi agent environment, for example in J. Van Den Berg et al. See J. Van Den Berg, S. J. Guy, M. Lin, and D. Manocha, "Reciprocal n-body collision avoidance," in *Robotics research*, pp. 3-19, Springer, 2011, incorporated herein by reference in its entirety. The problem is first modeled with non-convex collision cones. Later, hyperspaces are chosen such that only feasible velocities are left and require minimum deviation from the agents preferred velocity. Thus, the non-convex feasible space is converted into convex polytope. Each agent solves a quadratic objective function to avoid collision in multi agent dynamic environment. The algorithm is further improved in J. Snape et al. to deal with some issues related to oscillations in agents. See J. Snape, J. Van Den Berg, S. J. Guy, and D. Manocha, "The hybrid reciprocal velocity obstacle," *IEEE Transactions on Robotics*, vol. 27, no. 4, pp. 696-706, 2011, incorporated herein by reference in its entirety.

Generally, mathematical programming methods mostly assume the availability of global information, which is not possible for most real world applications. Also, these methods require considerable computational resources to run solvers and, therefore, may not be suitable for limited onboard (e.g., present on the vehicle or agent) computational capabilities. Potential field methods also typically require global information of the environment. These methods also have additional limitations of getting stuck into local minima and oscillations which are difficult to address. Sampling based methods may address the above issues but generally require a pre-processing step to acquire sampled topology of the environment. For multi agent dynamic environments, the sampling of environment in each time instant becomes a challenging task.

As disclosed herein, reactive planning methods can be structured to rely on limited computational resources and, therefore, are suitable for onboard motion planning applications. However, simple reactive methods cannot find efficient trajectories and may only be used in addition to some other planning algorithm. Simple reactive methods may be greedy algorithms and may get stuck in local minima especially in cluttered environments. Reactive methods in combination with optimization techniques may render good solution quality but may require high computational capabilities for onboard optimization. Also, non-convexity of the collision cones may be avoided by convex approximation of the feasible space but doing this is itself a cumbersome task.

Accordingly, in order to address the deficiencies of conventional methods, models and systems, the present disclosure provides a method and system that at least partially uses a model and corresponding calculation that is presented in multi-agent multi-obstacle scenario to provide real time on board collision avoidance.

BRIEF SUMMARY OF THE INVENTION

According to a first aspect the invention includes a method/model of controlling a vehicle that includes determining velocity vectors of one or more obstacles; determining boundaries of the one or more obstacles; defining a possible velocity space; determining a collision cone for each obstacle; identifying a velocity vector to produce a maximum motion in the direction of the vehicle target location and being outside all determined collision cones; controlling the vehicle to move in the space based on the identified velocity vector.

The invention further includes utilizing a difference between a direction of current velocity vector and a direction the identified velocity vector below a predetermined threshold and/or determining a boundary of an obstacle.

The invention further includes sorting the possible velocity and edge vectors and selecting an edge vector when the first edge vector is associated with a difference above the predetermined threshold.

The invention further includes 1, removing an obstacle from the one or more obstacles when a velocity vector farthest from the vehicle.

In a further aspect the vehicle includes a sensor configured to detect obstacles within a predefined range which may be an autonomous unmanned vehicle.

In a still further aspect the invention includes a vehicle that includes processing circuitry configured to receive a user input indicating a vehicle target location; determine velocity vectors of one or more obstacles present in a space; determine boundaries of the one or more obstacles; generate a possible velocity space, the possible velocity space including possible velocity vectors for the vehicle; determine a collision cone for each obstacle from the one or more obstacles based on at least the boundaries of the one or more obstacles; identify a velocity vector from the possible velocity space based on at least velocity vectors of the one or more obstacles, the velocity vector being identified as to produce a maximum motion in the direction of the vehicle target location and being outside all determined collision cones; control the vehicle to move in the space based on the identified velocity vector for a predetermined period; and optionally repeat until a current location of the vehicle corresponds with the vehicle target location.

In a still further aspect the invention includes a non-transitory computer readable medium storing computer-readable instructions therein which when executed by a computer cause the computer to perform a method for controlling a vehicle by receiving a user input indicating a vehicle target location; determining velocity vectors of one or more obstacles present in a space; determining boundaries of the one or more obstacles; generating a possible velocity space, the possible velocity space including possible velocity vectors for the vehicle; determining a collision cone for each obstacle from the one or more obstacles based on at least the boundaries of the one or more obstacles; identifying a velocity vector from the possible velocity space based on at least velocity vectors the one or more obstacles, the velocity vector being identified as to produce a maximum motion in the direction of the vehicle target location and being outside all determined collision cones; controlling the vehicle to move in the space based on the identified velocity vector for a predetermined period; and repeating until a current location of the vehicle corresponds with the vehicle target location.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
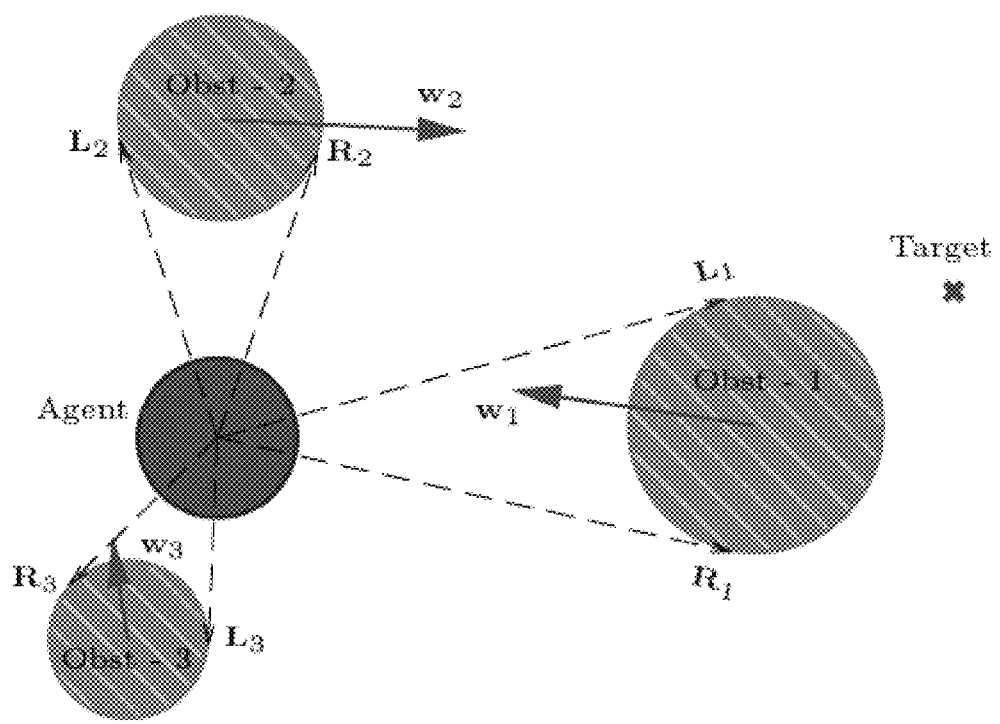
FIG. 1 is an environment model for single agent multiple obstacles, where $w_j$ is the current velocity of $j^{th}$ obstacle.

Embodiments of the present disclosure will now be described more fully hereinafter with reference to the accompanying drawings, in which some, but not all embodiments of the disclosure are shown. The present disclosure will be better understood with reference to the definitions, examples and descriptions provided herein.

A typical cluttered environment in which the method and system of the invention are used, includes N number of agents present and k number of obstacles. The agents are assumed to be spherical in shape with radius $r_i$ of the $i^{th}$ agent and are capable of holonomic motion. However, other shapes including parallelepiped, irregular, trapezoidal, cubic, cylindrical may be used with dimensional corresponding to the longest dimension. The agents preferably have the information of their respective target locations for example by receiving the location from another source such as a server but most preferably by submission from a passenger or autonomously by a system such as GPS. The obstacles present in the environment may be static or dynamic.

Representation of the obstacle and/or the vehicle may include uncertainty related to one or more aspects of its identity, dimensional characteristics or motion. The uncertainty is preferably represented by a separate parameter that describes the uncertainty in term relative to one or more of the characteristics or aspects of motion of the obstacle. For example, the uncertainty may be expressed mathematically as a percentage of, for example, the motion characteristics of the obstacle. The uncertainty may be represented as a fixed number (absolute), for example ±5 units of speed (e.g., km/hr) or as a percentage of the value (e.g., ±5%). The uncertainty conveys that a particular value associated with an obstacle may have a range of expected values. This is reflective of a practical application in which an obstacle undergoes changing velocity (e.g., for example when an automobile brakes or accelerates) or changes in size (e.g., when the angle of approach to an obstacle changes such that the visible cross-section of the obstacle changes with the angle of approach). In another aspect uncertainty can represent inherent measurement error or uncertainty in the sensors that used to detect obstacles and/or calculate/determine their characteristics. In this sense an initial value may be represented by a degree of confidence or tolerance that is representative of or includes measurement uncertainty/error. Further, a cumulative uncertainty may be associated with errors that arise when a plurality of sensors are used together. The uncertainty can be cumulative or may propagate non-linearly.

In a particular embodiment the method of the invention includes taking into account or separately calculating the uncertainty related to boundaries of one or more obstacles. This is especially the case when one or more edge vectors of a boundary of an obstacle are determined. The edge vectors may be associated with uncertainty related to dimensional characteristics of the obstacle or, characteristics of the angle of approach or angle of observation from which the obstacle is observed or calculated.

The boundary characteristics of the obstacle can be expressed dimensionally as a radius and/or diameter if the obstacle is represented by, for example, a spherical shape. However, if the obstacle is representative of a vehicle with dimensional characteristics that are not spherical, it may be represented by one or more conditions such as a width, height or length. In order to account for the greatest dimensional cross-section of the obstacle, preferably the vehicle is represented by a maximum dimension such as a maximum width.

The invention includes representation and control of vehicle in a 3-dimensional space. While often the control of a vehicle is sufficiently represented in two dimensions, there is no restriction that an additional dimension of control or boundary condition calculation can be included. This may be of particular importance when representing obstacles that are present in or moving in a dimension outside of the two-dimensional that is representative of the plane (road) in which the vehicle is being controlled. Examples of obstacles that are preferentially represented in three dimensions include power lines or low-flying aircraft. Likewise, obstacles such as bridges and overpasses are preferably represented in three dimensions in order to take into account clearance dimensions. Preferably the vehicle under control is represented on a map-type substrate that can be adequately represented in two dimensions. Obstacles, however, are preferably represented in three dimensions to take into account protrusions outside of the plane representing the substrate on which the vehicle is represented. Preferably the three-dimensional characteristics of the obstacle relate to the obstacle's cross-sectional area. Representation of the obstacle in three dimensions (especially when the obstacle is a vehicle) such that the depth of the obstacle is calculated is of lesser value at least in so far as determining collision and/or avoidance measures.

The agents may be equipped with some range sensors like sonars, cameras, infrared detectors, lasers or other devices which may have limited sensory capabilities enabling them to only recognize obstacles that are in some vicinity of radius $s_i$ around the $i^{th}$ agent. Additionally, each agent may only recognize the surface edges of obstacles and other agents exposed to it in its vicinity or may recognize a cross section perspective of the obstacle that may change as a function of the agents angle to the obstacle. The agents can also obtain velocity information $v_i$ and $w_j$ of every $i^{th}$ agent and $j^{th}$ obstacle respectively that is present in its sensor's range or this information may be provided by an external source such as a drone that is in wireless communication with the agent. The agents preferably are able to communicate with each other.

The agents plan their motion onboard while moving through the dynamic environment. The agents must be capable of recognizing and avoiding obstacles even without static or dynamic global information of the environment. The onboard capability preferably includes an algorithm or model, or circuitry programmed with instructions including said algorithm or model, capable of finding, calculating or identifying one or more collision free paths for each agent. The algorithm should be fast and simple enough to suit the limited onboard computational capability of the agents.

In an embodiment the method and system may rely on circuitry having instructions that include a mathematical formulation presented for a static (e.g., map) or dynamic (e.g., agent or obstacle location tracking) 2-D environment where the obstacles are assumed to be circular in shape but may be of any shape the same or different from the agent. Further, a search heuristic is preferably included to determine the agent's velocity and/or that generates collision free trajectory. The model can also be used for multi agent environments, where each agent needs to find collision free trajectories without any communication among them.

Figure 2:
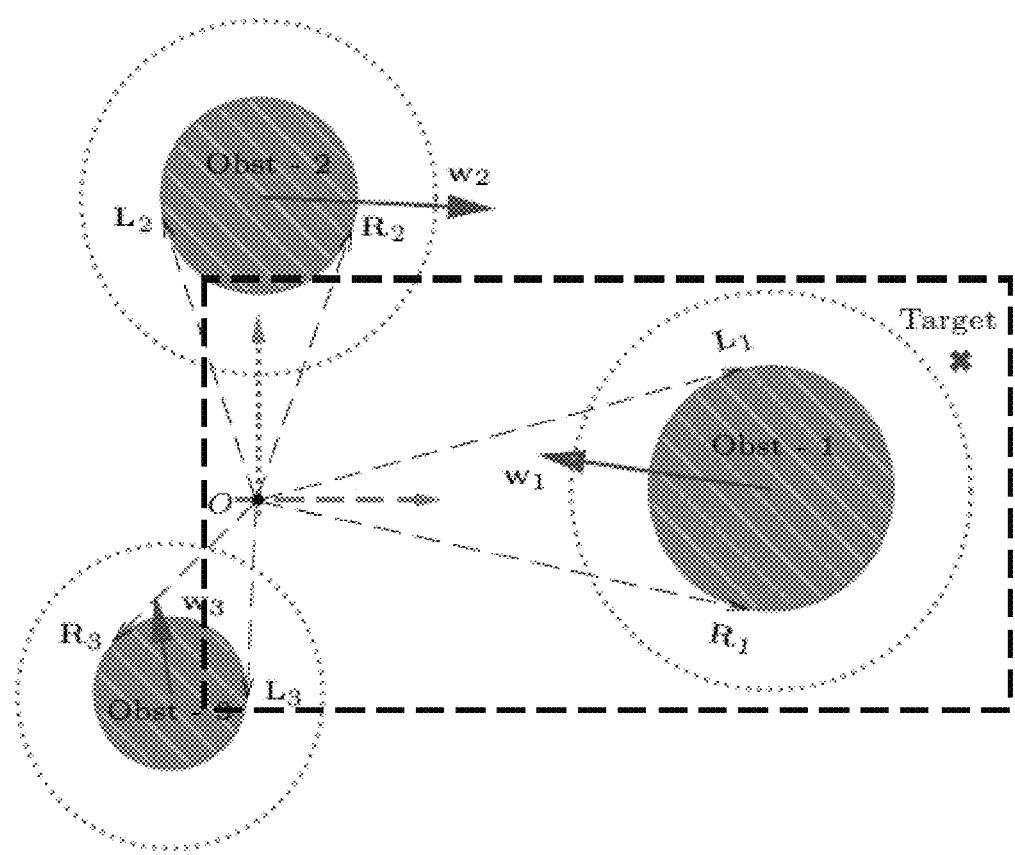
FIG. 2 illustrates collision spaces represented by the region enclosed by dotted circles around each obstacle.
Figure 3:
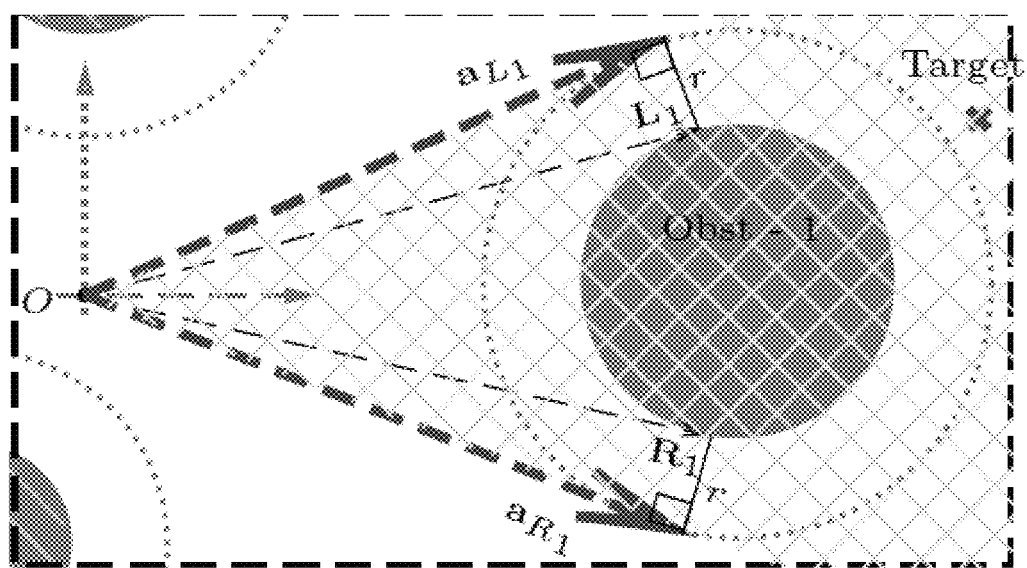
FIG. 3 illustrates construction of the collision cones using simple geometry.

In a scenario where an agent is present in a multi obstacle dynamic environment, the agent is preferably capable of gathering or receiving boundary/edge information of the obstacles present in some vicinity of its sensors. FIG. 1) represents a scenario where the agent has obtained the velocities and surface edges of the obstacles present in its vicinity. Each $j^{th}$ obstacle present in the vicinity the agent forms two vectors, $R_j$ and $L_j$, showing relative position of the right and left edges of its surface from the center of the agent respectively, where the agent's center is considered as the origin of the vector space. In order to avoid collision with an obstacle, the center of the agent preferably remains at some distance away from the obstacles. The set of all minimum distances, thus, form Collision Spaces (CS) which depend on the dimensions of the agent and each obstacle. The collision spaces with respect to each obstacle can be conveniently formed by taking the following Minkowski sum (See FIG. 2)):

$$A \oplus P_j = \{a + p_j | a \in A, p_j \in P_j\} \quad (2)$$

where A and $P_j$ are the vector spaces representing the shape of the agent and the $j^{th}$ obstacle respectively. It is important to point out here that the agent may not be able to find the minkowski sum due to the sensory limitations, however, the model of the problem presented here does not require the agent to calculate all the CSs for collision avoidance. Each pair of vectors, $R_j$ and $L_j$ for each obstacle as illustrated in FIG. 2, can be used in combination with the sum as obtained in Equation (2) to form the collision cone (CC). Preferably the agent will not collide with any of the obstacles in a future time if and preferably only if, its current relative velocity vector is outside all the collision cones (CCs), formed by the edge vectors of all the surrounding obstacle. A smaller rectangular region from FIG. 2) has been chosen to show the formation of the CC w.r.t Obstacle-1 (see FIG. 3)). Vectors $R_1$ and $L_1$ can be used together with the agent's radius, r, to find vectors $a_{R_1}$ and $a_{L_1}$ respectively in the right angled triangles shown in FIG. 3). The CC thus formed by these two vectors is convex. Similar CCs can be constructed with respect to all the obstacles detected by the agent. The agent's relative velocity, $c_j$, w.r.t to each of the $j^{th}$ obstacle should exist in a non-convex space outside of all the CCs in order to avoid collision with any of the obstacles, which is shown mathematically as follows:

$$c_j = c - w_j \cup CC \quad (3)$$

where, $$CC = \{x : x = \lambda_{R_j} a_{R_j} + \lambda_{L_j} a_{L_j} | \lambda_{R_j}, \lambda_{L_j} \in [0, \infty]\} \forall j. \quad (4)$$

Using Equations (3) and (4), following set of constraints can be written for the agent's relative velocity w.r.t Obstacle-1:

$$A_1 \lambda_1 \neq c_1 \quad (5)$$

where $A_1 = [a_{R_1} a_{L_1}]$, $$\lambda_1 = \begin{bmatrix} \lambda_{R1} \\ \lambda_{L1} \end{bmatrix}$$

such that $\lambda_1 \in R^m$ and the column vectors $a_{R_1}$, $a_{L_1} \in R^n$. The above system holds true if and preferably only if the following system does not have a solution:

$$A_1 \lambda_1 = c_1, \lambda_1 \geq 0 \quad (6)$$

According to the Farkas's lemma, if the system in Equation (6) does not have a solution, then the following system must have a solution (and vice versa):

$$A_1^T X_1 \leq 0$$
$$c_1^T X_1 > 0 \quad (7)$$

Figure 4:
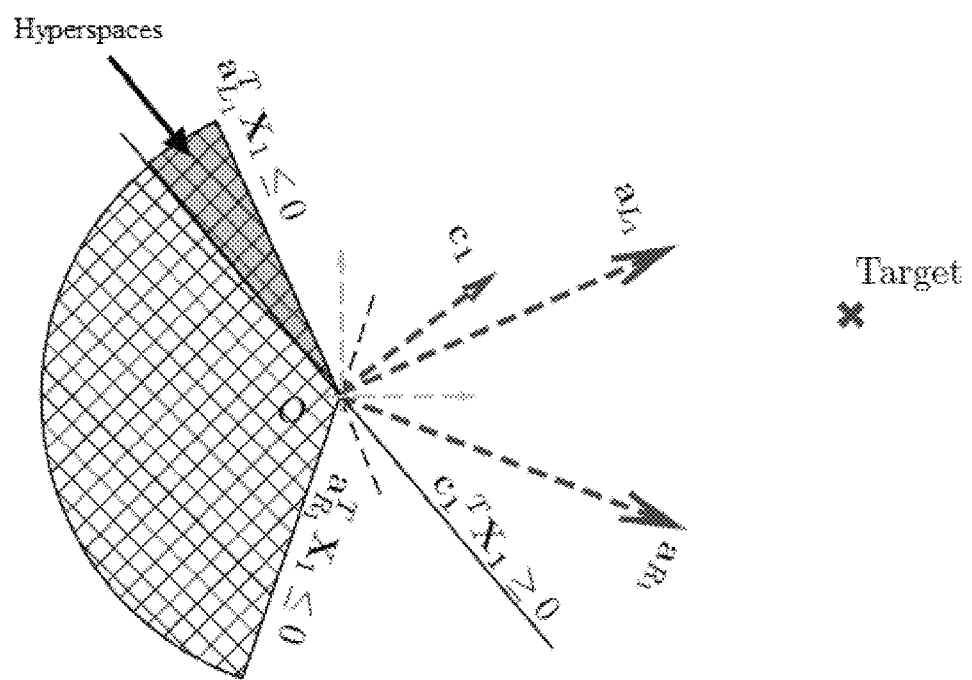
FIG. 4 illustrates the set of hyperspaces creating feasible space formed by the two collision cone vectors of Obstacle-1 and vector c.

The feasible space created by the above system of inequalities for Obstacle-1 is shown in FIG. 4). Also, it can be seen that the new relative velocity vector of the agent, c1, will generate a collision free trajectory with respect to Obstacle-1 if and only if, the above set of constraints in Equation (7) has a solution. The vector c1 in FIG. 4) is outside the collision cone and therefore, the hyperspaces formed by the vectors have a solution, i.e., they form a feasible space.

Figure 5:
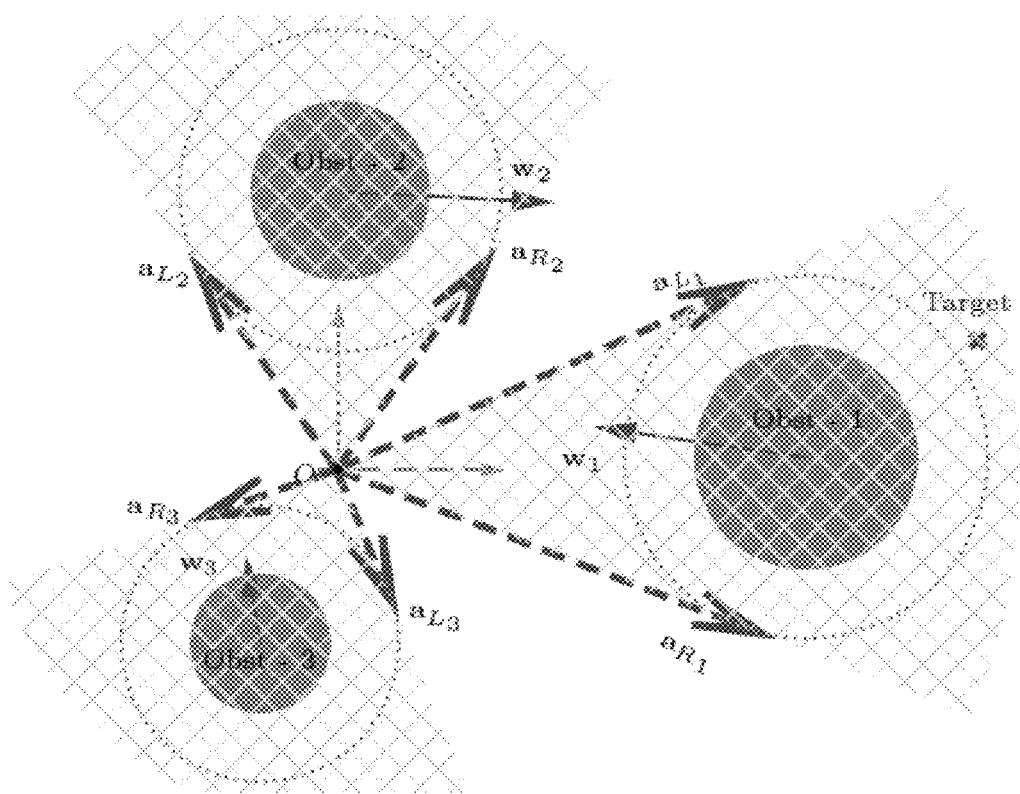
FIG. 5 illustrates obstacles moving with velocity, $w_j$, and CCs formed by their respective vectors.

Equation (7) forms a block of set of constraints required to check the feasibility of agent's new velocity with respect to one obstacle. Similar CCs can also be formed for the other obstacles as shown in FIG. 5). Each CC can then be used to form the set of half spaces for each $j^{th}$ obstacle and then formulated in a blocked structured LP as presented in Formulation (8). The LP will be feasible if and only if all cj are outside their respective collision cones.

$$\min c_i^T X_1 + \ldots c_j^T X_j + \ldots c_k^T X_k \quad (8)$$
s.t. :

$$a_{R_1}^T X_1 \leq 0$$
$$a_{L_1}^T X_1 \leq 0$$
$$c_1^T X_1 \geq \varepsilon$$
$$\vdots$$
$$a_{R_j}^T X_j \leq 0$$
$$a_{L_j}^T X_j \leq 0$$
$$c_j^T X_j \geq \varepsilon$$
$$\vdots$$
$$a_{R_k}^T X_k \leq 0$$
$$a_{L_k}^T X_k \leq 0$$
$$c_k^T X_k \geq \varepsilon$$

where, $c_j = c - w_j$, $\forall j$, and $\varepsilon$ is a small positive scalar. The above LP is used to check the feasibility of the new velocity vector c in a non-convex space in order to obtain a collision free trajectory. The search for c is done through a heuristic method presented in IV-C.

Although the size of the constraint matrix formed in the above LP increases with the increase in number of obstacles, the sparse structure of the constraint matrix significantly reduces the solution time. Improving the above LP is not the prime intention rather it is preferably just to check its feasibility, which is usually done in the pre-processing step by the solver and preferably requires no simplex iterations. So, the objective function in Equation (8) is chosen only for convenience.

The agent's new velocity vector c is preferably chosen such that it satisfies the agent's kinodynamic constraints. The agent's current acceleration, $g_a$, and its current velocity, $v_a$, determines its future velocity, c, in the next iteration after $\tau$ time step. Both $g_a$ and $v_a$ are bounded and the kinodynamic constraints on acceleration and velocity can be written as follows:

$$v_{min} \leq \|c\|_2 \leq v_{max} \quad (9)$$

$$a_{min} \leq \|g_a\|_2 \leq a_{max} \quad (10)$$

$$c = \tau g_a + v_a \quad (11)$$

$a_{min}$ and $v_{min}$ are the lower bounds, while $a_{max}$ and $v_{max}$ are the upper bounds on agent's current acceleration and future velocity after $\tau$ time step, respectively.

Method/model (1) utilizes a greedy approach to find the feasible velocity vector c and may create stalling in some scenarios. A randomized greedy algorithm is presented wherein a smart approach is used to avoid stalling while keeping intact the speed of the solution.

1) Greedy Algorithm: The working of Formulation (8) can be seen in method/model (1). All the edge vectors, $a_{R_j}$ and $a_{L_j}$ are obtained for each $j^{th}$ obstacle in the agent's vicinity. According to Equations (9), (10) and (11), a uniform random sample of the Possible Velocity Space (PVS) is generated. These possible velocity vectors are then stored according to the descending order of their dot products with the relative target vector of the agent, $Z_a$. Algorithm (1) selects the velocity that produces maximum motion in the direction of the target while avoiding collision with the obstacles in its vicinity in any future time. As shown in Algorithm (1), the sorted velocity vectors from the sampled PVS are tested for feasibility and the first feasible is chosen as c.

---
Algorithm 1: Greedy Algorithm
---

Input:
  $r_a \leftarrow$ Agent's radius;
  $p_a \leftarrow$ Agent's current location;
  $T_a \leftarrow$ Agent's target location;
  $S_a \leftarrow$ Agent's velocity sample size;
1 while $\|T_a - p_a\|_2 \geq \xi$ do
  | /* $\xi$ is a small positive scalar                    */
2 |   $Z_a \leftarrow T_a - p_a$;
  |   Data: Obtain the edge vectors $a_{R_j}$, $a_{L_j}$ and the
  |     velocity vector $w_j$ for each $j^{th}$ obstacle
  |     present in the agent's vicinity such that,
  |     $\|q_j - p_a\|_2 < \|Z_a\|_2 \forall j$
  |   /* Generate uniform random sample of
  |     possible velocities according to
  |     Eq. (9), (10) and (11)                              */
3 |   PVS $\leftarrow$ rand($S_a$,2);
4 |   PVS $\leftarrow$ sort(PVS,dot(PVS[i],$Z_a$));
5 |   for i=1 to rows of PVS do -continued Algorithm 1: Greedy Algorithm

```
 6  |   | c ← PVS[i];
 7  |   | Formulate LP as in Eq. (8);
 8  |   | Solve LP;
 9  |   | if LP is feasible then
10  |   |   | Solution for c is found;
11  |   |   | break out of for loop;
12  |   | else
13  |   └   └ c ← 0
14  | v_a ← c;
15  | φ ← runtime of current while loop;
16  | Wait(τ − φ);  /* where τ > φ        */
    |               /* Update agent's position */
17 └ p_a ← τv_a + p_a;
```

Figure 6:
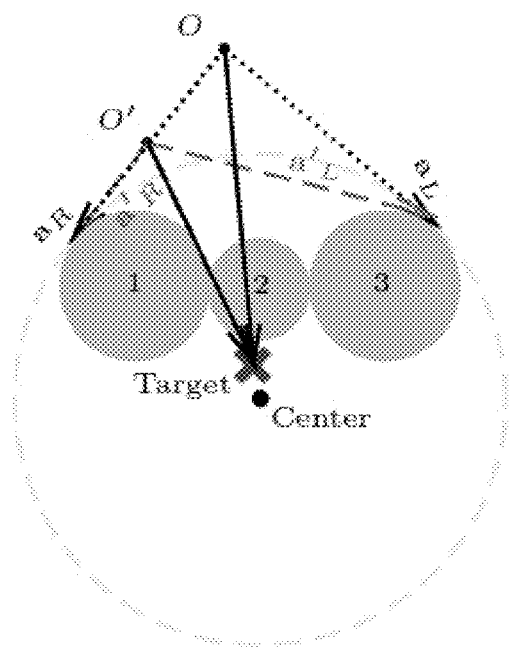
FIG. 6 illustrates stalling in a single agent-multi static obstacle case.

2) Stalling: The phenomenon of stalling can be explained with the example as shown in FIG. 6). In order to move as close as possible to the target from position O, the only two best possibilities are to move in either of the direction of the edge vectors, $a_R$ and $a_L$. Let's suppose that using Algorithm (1), the agent finds $a_R$ as its most feasible direction of motion. Hence, O and O' show the agent's initial location and the location it moved in one iteration of T time-step respectively. The target in this case is closer to the agent w.r.t the center of an imaginary circle formed by the two tangents which are represented by the two extreme edge vectors, $a_R$ and $a_L$, of the obstacles. In such a scenario, following conditions always hold:

$$a'_R{}^T Z'_a < a_R{}^T Z_a \quad (12)$$

$$a'_L{}^T Z'_a > a_L{}^T Z_a \quad (13)$$

where $Z_a$ and $Z'_a$ are vectors from the agents locations O and O' to the target respectively. As per the above results, the model/method has identified, calculated or determined a better direction to move and the greedy approach as explained earlier will results in the agent to change its direction abruptly in the very next iteration. The criterion for the selection of c in model/method (1) will stall the agent's motion. Stalling may be avoided by enforcing the agent not to change the direction of its velocity very rapidly as compared to its previous velocity. Constraining the agent's velocity in this manner may also help to reduce mechanical jerks on the system and produce smooth trajectories.

Thus, the following additional constraint is put on agent's velocity to avoid stalling and rapid changes in the direction of its velocity:

$$c^T v_a \geq 0 \quad (14)$$

3) Model/method: For static environments, it can be easily seen that if there exists a collision free path, the c vector in the direction of at least one of the edge vectors of the obstacles must be feasible. Therefore, all the possibilities of the edge vector directions are first tested for feasibility in the PVS. For this, the agent's acceleration constraints as given by Equation (10) are assumed to be such that a nominal velocity with the magnitude of at least, $\mu_a$, is possible to achieve in any direction from the current velocity, $v_a$.

The edge vectors are sorted, similar to other possible velocity vectors from PVS, in descending order of their dot product with the target vector. If there comes a situation when the new velocity c in the direction of some edge vector is feasible but does not satisfy the constraint in Equation (14), it is neglected and the search continues. The next vector from the sorted edge vectors stack is chosen for feasibility test as given in Algorithm (2).

The model/method not only finds collision free trajectories in an efficient manner but also avoids stalling situations. However, it is preferable not to use the edge vectors created by the obstacles that are moving away from the agent, in a direction opposite to the direction of the target and will never be come into the path of the agent with their current velocities. Similarly, for cases where no solution is found due to the presence of obstacles all around the agent, the edge vectors of the farthest obstacle may be neglected and the algorithm be repeated until a solution is found.

Same strategy can be applied for the multi-agent scenario where each agent considers all the agents around it as obstacles, since the agents are assumed to have no communication protocol between them. Most of the recent trajectory planning methods in dynamic environments are computationally very expensive and may require global information to effectively plan the trajectories. The model/method of the present disclosure is designed to effectively deal with dynamic situations where global information may not be available. Such methods are practical in scenarios where acquiring global information is difficult and expensive, and may require huge onboard computational resources. For cases where global information is available, it may be incorporated in the proposed model/method by simply updating the target value for each agent that may be obtained from the global path planning.

Examples

Having generally described this disclosure, a further understanding can be obtained by reference to certain specific examples in which the method/mode of the invention is tested is different environments simulated to represent multi-agent and multi-obstacle environments encountered in ordinary daily life. The examples below are provided herein for purposes of illustration only and are not intended to limit the scope of the claims.

The model/method was tested for numerous single and multi agent situations with obstacles. Results of four scenarios are presented to show the efficiency of the model/method:

1) Static complicated scenarios requiring exploration.
2) U-shaped scenarios with Non-Linear Velocity Obstacles (NLVO).
3) Multi agent dense scenarios with all randomly located and randomly moving obstacles.
4) Multi agent scenario with evenly placed agents on the periphery of a circle and the agents have to navigate to their antipodal positions on the circle.

Figure 7:
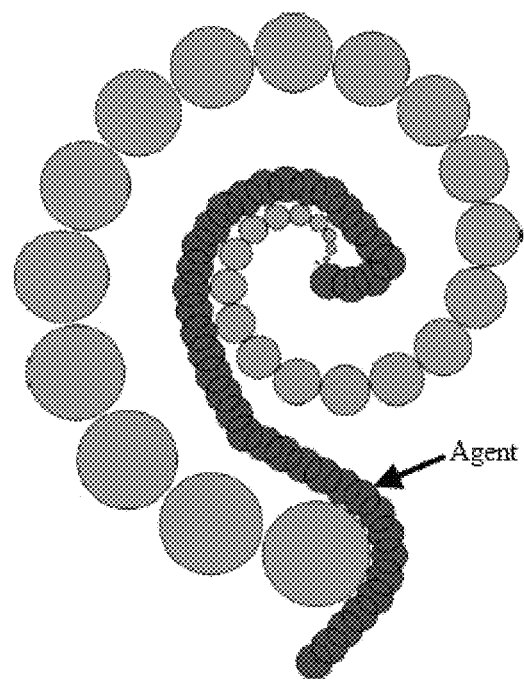
FIG. 7 is an agent found the trajectory to navigate outside the spiral maze.

Situations in which the agent is surrounded by the obstacles generate infeasible space and the model/method may not find any solution. However, there may exist a solution if the obstacles are not evenly located around the agent. In such cases, the CC of the farthest obstacle is neglected to enable the agent to explore the environment. A spiral maze scenario is shown in FIG. 7). The model/method may not find a solution initially in a particular time instant but as the constraints on CC of the farthest obstacles are relaxed, the agent finds its way out of the spiral maze to its target.

Figure 8:
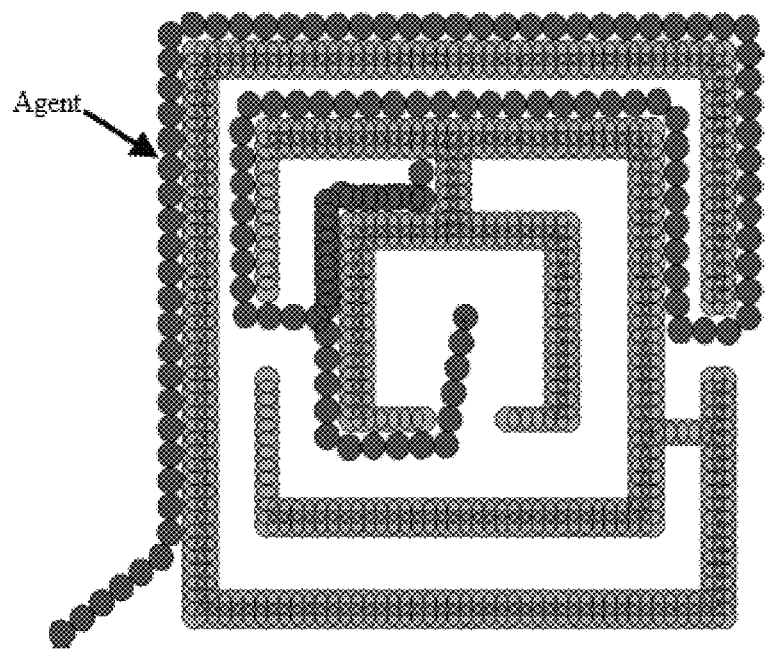
FIG. 8 is an agent navigating to the target located inside the complicated maze structure.

A more complicated maze scenario is shown in FIG. 8) where the agent's sensing vicinity is set to a small number similar to the width of the passage ways of the maze. Reducing the agents sensing radius results in tracking of the wall which enables the agent to navigate to its target. However, such scenarios typically require global path planning methods and since the model/method is preferably a local planning method, it may not be able to find a feasible path in all similar scenarios.

Figure 9:
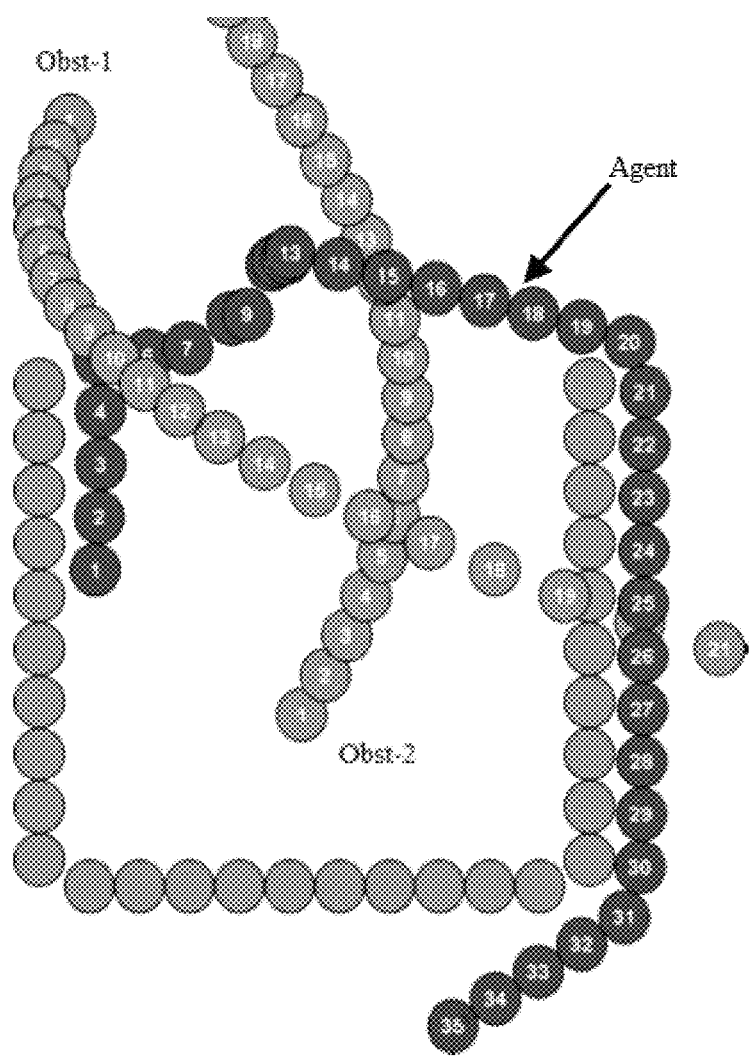
FIG. 9 is an agent navigating to the target located inside the complicated maze structure.

Local planning methods are typically greedy in nature and may face phenomenon of stalling. However, the inclusion of an additional constraint given by Equation (14) in the model/method permits it to handle situations, similar to the one shown in FIG. 9) where some static obstacles are positioned in a U-Shaped structure. Additionally, there are 2 moving obstacles having non-linear velocity profiles. Initially, Obstacle-1 is outside while Obstacle-2 and the agent are inside the U-shaped structure. The y-component of the velocity of Obstacle-1 is constant and is in negative y direction while its x-component accelerates constantly in the positive x direction. Obstacle-2 has a sinusoidal velocity profile which moves it out of the U-shaped structure. The instances of the moving obstacles and the agent are printed with the index number of each iteration to show their motion w.r.t time.

The agent first tries to avoid collision with Obstacle-1 by changing its direction of motion in the positive x direction. However, as the agent proceeds with its motion after iteration number 5, it slightly changes its direction of motion and reduces the speed to avoid a potential future collision with both Obstacle-1 and Obstacle-2 (see iteration 9-13 in FIG. (9)) and reaches its target.

Figure 10:
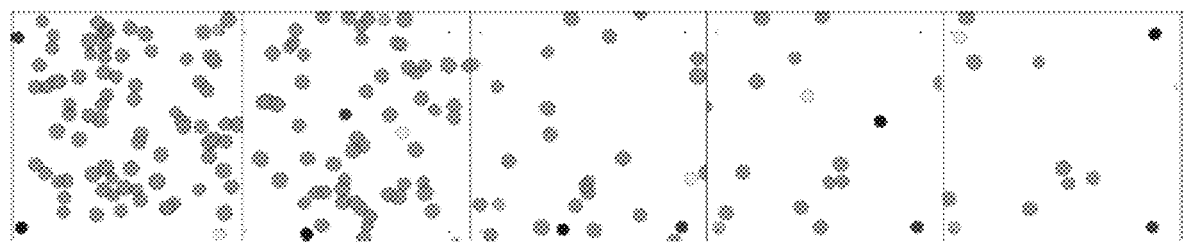
FIG. 10 shows four agents initially located at corners of a square of sides 100 units each in a dense environment with 80 randomly placed and randomly moving obstacles.

The model/method also performs well in dense and dynamic scenarios. One such scenario is presented in FIG. 10), where 4 agents are present among 80 randomly positioned, randomly sized (radius=3.5-4.5 units) and randomly moving obstacles inside the area formed by a square of sides 100 units each. The agents are positioned at the corner of the square while each of their targets are located at diagonally opposite corners. The agents locally find collision free trajectories and reach to their targets as shown in FIG. (10).

Figure 11:
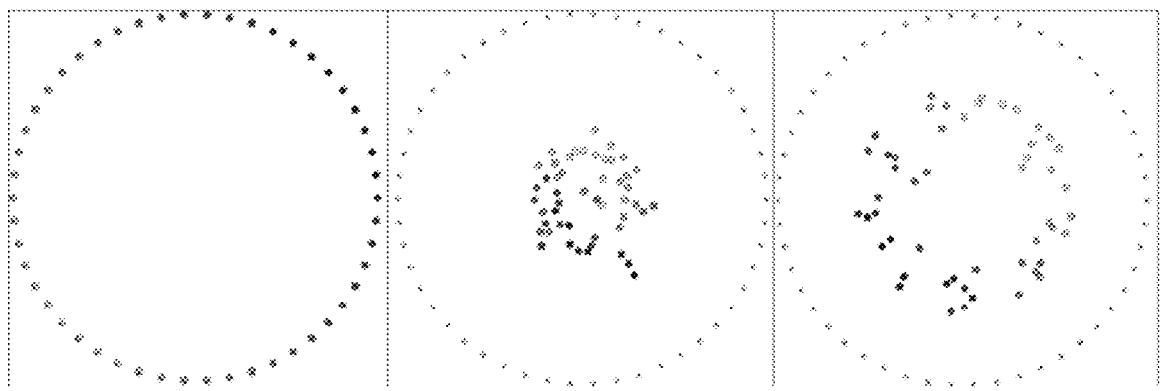
FIG. 11 shows 50 agents initially located symmetrically on the periphery of a circle with their targets located at the antipodal position of their initial location.

Another dense scenario is shown in FIG. 11) where 50 agents are symmetrically placed at the periphery of a circle and they have to navigate to their antipodal positions on the circle. The agents are first seen to converge at around the center of the circle and then effectively avoid collision to navigate to their respective targets.

Figure 12:
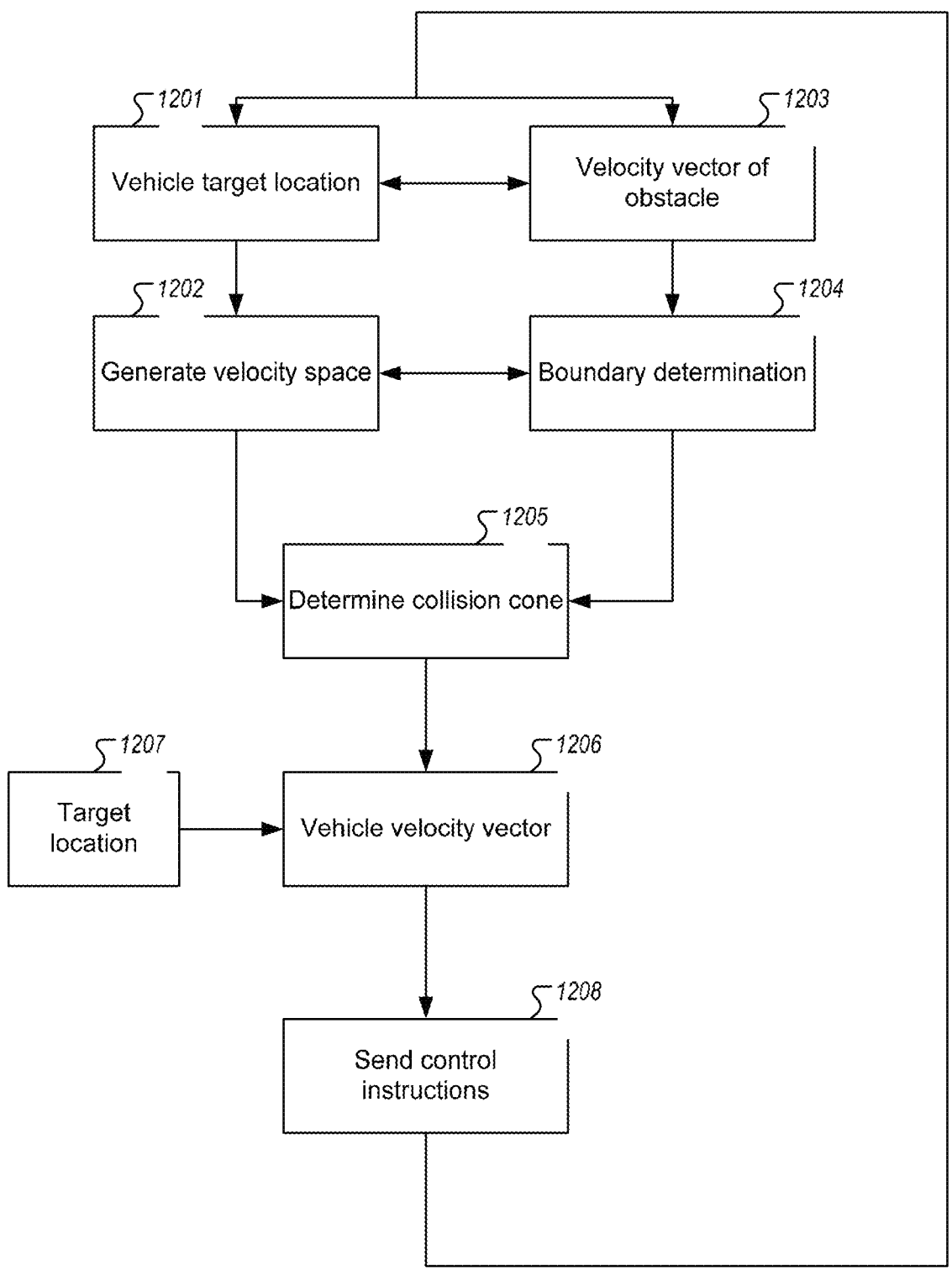
FIG. 12 is a flowchart of a method for controlling a vehicle according to an exemplary embodiment of the present disclosure.

FIG. 12 describes a flowchart representing an embodiment of the present disclosure that includes controlling a vehicle. In process circuitry that may be located in the vehicle, or alternately another vehicle or in a location wirelessly connected to but physically separate from the vehicle being controlled, a vehicle target location, vehicle predicted location and/or a vehicle present location is first obtained or received 1201. The target location and/or present location of the vehicle is used to generate one or more velocity spaces representing a path and/or a velocity space of the vehicle 1202. Concurrently, before or after the velocity space is generated, a velocity vector of one or more obstacles may be obtained, determined or calculated 1203. The velocity vector of the obstacle, stationary or moving, is used to determine one or more boundary conditions of the obstacle 1204. The boundary condition determination may occur concurrently, before or after the velocity space is obtained for the vehicle. Subsequently 1205 a collision cone is determined which, in some embodiments, represents a risk factor of collision or overlap between the trajectory of the vehicle and the trajectory or location of the obstacle. The collision cone may be determined utilizing one or more of the equations and methods described the present disclosure 1205. A vehicle velocity vector is subsequently calculated, determined or identified 1206. The vehicle velocity vector may be determined by further reference to the vehicle target location in present time, in future time or as a prediction based upon the vehicle velocity and trajectory. Subsequently one or more control instructions is dispatched to the vehicle 1208. The control instructions are dispatched regularly to accommodate changes in the space environment of the vehicle and/or to accommodate changes in the velocity trajectory of the obstacles.

Motion planning has diverse applications in real life problems. Improvements in drone technology have created a number of possibilities for inclusion in the model/method of the invention. For instance, one key area is logistics which is usually the most critical and expensive component of any supply chain. With the expansion of internet, a lot of retail business has shifted online. Enterprises like Amazon and DHL plan to invest huge resources in the research of AUVs capable of planning their route to numerous target locations and thus managing the delivery of goods to their customers. Likewise, autonomous drones may also be used for surveillance purposes where they have to operate in open environment with limited resources and sensing capabilities. Flying machines can also be used in emergency situations like fire-fighting, rescue operations, bomb disposal, first-aid delivery, fog and smog prevention etc.

Similarly, the progression in nanotechnology, nano-fabrication and microelectronics has significantly reduced the size of onboard embedded computing systems, permitting the development of miniature robots and mechanisms capable of making decisions and performing complicated tasks in the areas that cannot be accessed otherwise. One such application is in the field of medicine where such miniature agents can plan their motion while moving with the blood stream or in the intestinal canal of the human body to reach the assigned target location and perform a certain task like operating a tumor.

In all of the above discussed areas, the onboard motion planning specially performed in dynamic environment is a complicated task and conventional model/methods are either computationally very expensive or compromise too much on the optimality.

Of course, most of the above applications are available with only local knowledge of the environment and, therefore, global optimal in these situations may not always occur. The model/method of the invention, thus, can be utilized to navigate towards target in such difficult situations.

Figure 13:
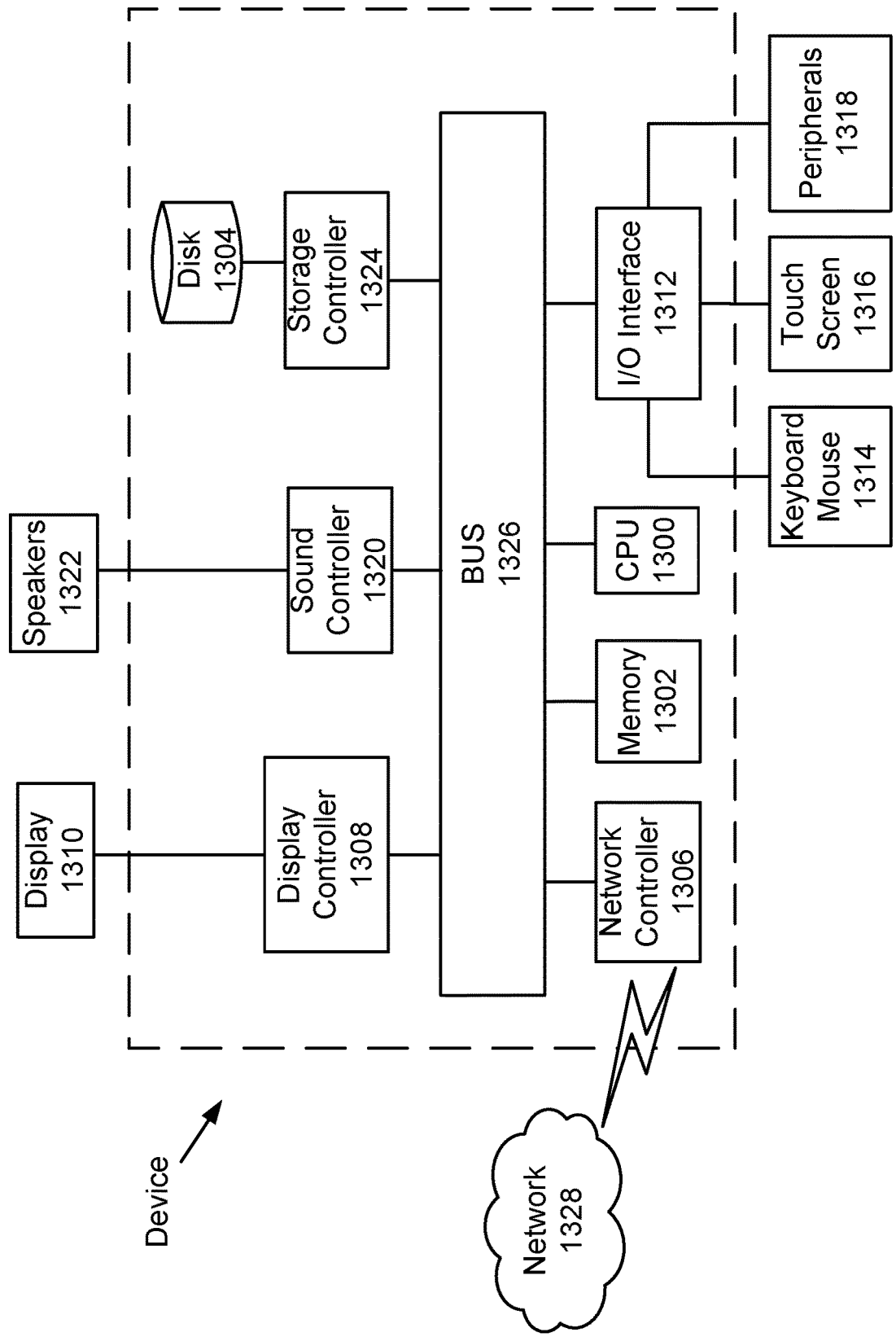
FIG. 13 is a hardware description of a device and/system that is capable of carrying out the method through for example circuitry, according to an exemplary embodiment of the present disclosure.

Next, with reference to FIG. 13, a hardware description of a device implementing a method/model of the invention, according to exemplary embodiments, is described. In FIG. 13, the device includes a CPU 1300 which performs the processes described above/below. The process data and instructions may be stored in memory 1302. These processes and instructions may also be stored on a storage medium disk 1304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

In embodiments of the invention the CPU 1300 is preferably present in the vehicle or agent which is being controlled. For example, CPU 1300 may be installed directly in the control system of an automobile. Likewise, the memory 1302 and/or the storage medium disk 1304 may be, and preferably are, directly installed on the vehicle being controlled. In other embodiments of the invention the CPU 1300, the memory 1302 and flash or the storage medium disk 1304 may each independently be located or stored remotely from the vehicle which is being controlled by the method/model and/or system of the invention. For example, any of these components may be connected wirelessly to the vehicle in one or more locations remote from the vehicle.

Further, the claimed advancements may be provided together at least partially as a utility application, background daemon, or component of an operating system, or combination thereof, executing in conjunction with CPU 1300 and an operating system such as Microsoft Windows 7, UNIX, Solaris, LINUX, Apple MAC-OS and other systems known to those skilled in the art.

The hardware elements in order to achieve the device may be realized by various circuitry elements, known to those skilled in the art. For example, CPU 1300 may be a Xenon or Core processor from Intel of America or an Opteron processor from AMD of America, or may be other processor types that would be recognized by one of ordinary skill in the art. Alternatively, the CPU 1300 may be implemented on an FPGA, ASIC, PLD or using discrete logic circuits, as one of ordinary skill in the art would recognize. Further, CPU 1300 may be implemented as multiple processors cooperatively working in parallel to perform the instructions of the inventive processes described above.

As noted herein certain components of the device may be wirelessly communicating with the vehicle. Such wireless communication may take place over a device such as shown in FIG. 13. The device in FIG. 13 also includes a network controller 1306, such as an Intel Ethernet PRO network interface card from Intel Corporation of America, for interfacing with network 1328. As can be appreciated, the network 1328 can be a public network, such as the Internet, or a private network such as an LAN or WAN network, or any combination thereof and can also include PSTN or ISDN sub-networks. The network 1328 can also be wired, such as an Ethernet network, or can be wireless such as a cellular network including EDGE, 3G and 4G wireless cellular systems. The wireless network can also be WiFi, Bluetooth, or any other wireless form of communication that is known.

The device further includes a display controller 1308, such as a NVIDIA GeForce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the device, such as Sound Blaster X-Fi Titanium from Creative, to interface with speakers/microphone 1322 thereby providing sounds and/or music. The general purpose storage controller 1324 connects the storage medium disk 1304 with communication bus 1326, which may be an ISA, EISA, VESA, PCI, or similar, for interconnecting all of the components of the device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The invention claimed is:

1. A method of controlling a vehicle, the method comprising:

(a) receiving a user input indicating a vehicle target location;
(b) receiving sensor information from at least one sensor included in the vehicle for one or more obstacles within a predefined radius r around the vehicle;
(c) determining, using processing circuitry included in the vehicle, velocity vectors of the one or more obstacles;
(d) determining boundaries of the one or more obstacles,
(e) generating a possible velocity space, the possible velocity space including possible velocity vectors for the vehicle;
(f) determining a collision cone for each obstacle from the one or more obstacles based on at least the boundaries of the one or more obstacles;
(g) identifying a velocity vector from the possible velocity space based on at least velocity vectors of the one or more obstacles in accordance with a greedy algorithm that is subject to a constraint that a difference between the direction of current velocity vector and a direction of the identified velocity vector is below a predetermined velocity direction threshold, the velocity vector being identified as to produce a maximum motion in the direction of the vehicle target location from a current location of the vehicle and being outside all determined collision cones for each obstacle within the radius r, wherein the greedy algorithm determines a solution to a sparse structured constraint matrix;
(h) updating the current location of the vehicle to an updated location;
(i) controlling the vehicle to move in the space based on the identified velocity vector for a predetermined period; and
(j) repeating steps (b) through (i) until the updated location of the vehicle corresponds with the vehicle target location.

2. The method of claim 1, wherein each obstacle has a velocity direction indicating a movement towards the vehicle.

3. The method of claim 1, further comprising:
wherein when the greedy algorithm does not find a solution to the sparse structured constraint matrix due to the presence of obstacles surrounding the vehicle, removing an obstacle from the one or more obstacles and repeating greedy algorithm in order to identify a velocity vector, the removed obstacle being the farthest from the vehicle.

4. The method of claim 1, wherein the obstacles includes one or more vehicles.

5. The method of claim 1, wherein the vehicle is an autonomous unmanned vehicle.

6. The method of claim 1, wherein determining a boundary of an obstacle includes determining an edge vector including a right edge vector and a left edge vector.

7. The method of claim 6, further comprising:
sorting the possible velocity vectors in a first order;
sorting edge vectors in the first order;
selecting a first edge vector from the sorted edge vectors; and
selecting a second edge vector when the first edge vector is associated with a difference above the predetermined threshold, the second edge vector being a next vector in the sorted edge vectors.

8. The method of claim 1, wherein the velocity vector is based on kinodynamic constraints, the kinodynamic constraints including the vehicle velocity vector and a vehicle acceleration.

9. The method of claim 8, wherein the kinodynamic constraints includes bounding the vehicle velocity vector and the vehicle acceleration by predefined upper and lower bounds.

10. The method of claim 1, wherein the collision cone includes determining a collision space.

11. The method of claim 10, wherein determining the collision space includes:
  determining a size of the vehicle;
  determining a first relative position of the vehicle to a first edge of each obstacle;
  determining a second relative position of the vehicle to a second edge of each obstacle; and
  forming the collision space based on first relative positions of the one or more obstacles, second relative positions of the one or more obstacles, and the size of the vehicle.

12. The method of claim 11, wherein the size of the vehicle is estimated as a maximum width.

13. A vehicle, comprising:
  at least one sensor configured to detect obstacles within a predefined range;
  processing circuitry configured to:
  (a) receive a user input indicating a vehicle target location;
  (b) receive sensor information from the at least one sensor for the detected obstacles;
  (c) determine velocity vectors of one or more obstacles present in a space;
  (d) determine boundaries of the one or more obstacles;
  (e) generate a possible velocity space, the possible velocity space including possible velocity vectors for the vehicle;
  (f) determine a collision cone for each obstacle from the one or more obstacles based on at least the boundaries of the one or more obstacles;
  (g) identify a velocity vector from the possible velocity space based on at least velocity vectors of the one or more obstacles in accordance with a greedy algorithm that is subject to a constraint that a difference between the direction of current velocity vector and a direction of the identified velocity vector is below a predetermined velocity direction threshold, the velocity vector being identified as to produce a maximum motion in the direction of the vehicle target location from a current location of the vehicle and being outside all determined collision cones for each detected obstacle, wherein the greedy algorithm determines a solution to a sparse structured constraint matrix;
  (h) update the current location of the vehicle to an updated location;
  (i) control the vehicle to move in the space based on the identified velocity vector for a predetermined period; and
  (j) repeat steps (b) through (i) until the updated location of the vehicle corresponds with the vehicle target location.

14. The vehicle of claim 13, wherein determining a boundary of an obstacle includes determining an edge vector including a right edge vector and a left edge vector.

15. The vehicle of claim 14, wherein the processing circuitry is further configured to:
  sort the possible velocity vectors in a first order;
  sort edge vectors in the first order;
  select a first edge vector from the sorted edge vectors; and
  select a second edge vector when the first edge vector is associated with a difference above the predetermined threshold, the second edge vector being a next vector in the sorted edge vectors.

16. A non-transitory computer readable medium storing computer-readable instructions therein which when executed by a computer cause the computer to perform a method for controlling a vehicle, the method comprising:
  (a) receiving a user input indicating a vehicle target location;
  (b) receiving sensor information from at least one sensor included in the vehicle for one or more obstacles within a predefined radius r around the vehicle;
  (c) determining velocity vectors of the one or more obstacles;
  (d) determining boundaries of the one or more obstacles;
  (e) generating a possible velocity space, the possible velocity space including possible velocity vectors for the vehicle;
  (f) determining a collision cone for each obstacle from the one or more obstacles based on at least the boundaries of the one or more obstacles;
  (g) identifying a velocity vector from the possible velocity space based on at least velocity vectors the one or more obstacles in accordance with a greedy algorithm that is subject to a constraint that a difference between the direction of current velocity vector and a direction of the identified velocity vector is below a predetermined velocity direction threshold, the velocity vector being identified as to produce a maximum motion in the direction of the vehicle target location from a current location of the vehicle and being outside all determined collision cones for each obstacle within the radius r, wherein the greedy algorithm determines a solution to a sparse structured constraint matrix;
  (h) update the current location of the vehicle to an updated location;
  (i) controlling the vehicle to move in the space based on the identified velocity vector for a predetermined period; and
  (j) repeating steps (b) through (i) until the updated location of the vehicle corresponds with the vehicle target location.

* * * * *